United States Patent [19]

Pfalzgraf

[11] Patent Number: 4,840,520
[45] Date of Patent: Jun. 20, 1989

[54] MOUNTING DEVICE HAVING A CONICAL SHANK

[76] Inventor: Emile Pfalzgraf, 7, rue de Neuwiller, 67330 Bouxwiller, France

[21] Appl. No.: 197,123

[22] Filed: May 19, 1988

[30] Foreign Application Priority Data

Nov. 23, 1987 [FR] France .............................. 87 16604
Dec. 21, 1987 [EP] European Pat. Off. ......... 87440086.4

[51] Int. Cl.⁴ .......................... B23C 9/00; B23B 31/00
[52] U.S. Cl. .................................. 409/232; 279/1 A; 408/239 A
[58] Field of Search ....................... 409/232, 234, 233; 408/239 A, 239 R; 279/1 A, 1 TS, 8; 82/36 A, 36 B

[56] References Cited

U.S. PATENT DOCUMENTS

| | | | |
|---|---|---|---|
| 3,680,435 | 8/1972 | Deplante | 409/232 |
| 4,238,167 | 12/1980 | Brugger et al. | 409/232 |
| 4,412,767 | 11/1983 | Schmid et al. | 409/234 |
| 4,548,532 | 10/1985 | Watanabe et al. | 408/239 A X |

FOREIGN PATENT DOCUMENTS

| | | | |
|---|---|---|---|
| 3506901 | 8/1986 | Fed. Rep. of Germany | 279/1 A |
| 42235 | 3/1984 | Japan | 409/232 |
| 16329 | 1/1985 | Japan | 409/233 |
| 1207652 | 1/1986 | U.S.S.R. | 409/233 |
| 2177031 | 1/1987 | United Kingdom | 279/1 A |

*Primary Examiner*—William Briggs
*Attorney, Agent, or Firm*—Young & Thompson

[57] ABSTRACT

The present invention relates to mounting device having a conical spindle, especially with a 7/24ths cone, with conical and butt contact for attachments, tool holders and tools characterized in that it is essentially constituted by a cone (1) introducible into the spindle (2), by a forward part (3) centered in the cone (1) and provided with the collar (4) for application against the face of the spindle (2), by a pull rod (5) for assembling the cone (1) and the forward part (3), by a resilient assembly (6) for pressing the cone (1) into the spindle (3) in locking position, mounted in compression between the cone (1) and the forward part (3), and by structure (7) for adjusting said pressing assembly (6).

14 Claims, 6 Drawing Sheets

MOUNTING DEVICE HAVING A CONICAL SHANK

The present invention concerns the field of computer controlled machine tool accessories, machining apparatus, units and general purpose workshops, and has for an object a mounting device having a conical shank, especially with a 7/24ths cone, with conical and butt contact, for attachments, tool holders and tools, intended for such machines with automatic or manual tool changing capability.

At present, fixation or mounting of a tool or tool attachment in the spindles of computer controlled milling or boring machines, machining centers or units and generally purpose workshops, is generally effected by means of conical shanks of which the most common conicity is 7/24ths. Such mounting and fixation have been satisfactory up until now, and remain satisfactory for certain applications.

The advent of machining centers with the 7/24ths cone, most of the time having a frusto-conical rear and a central collar for automatic tool changing, has lead to the modification of the conventional 7/24th cone with simple collar and rear screw threading for fixation by screw threaded pulling.

The majority of the spindles of machines constructed at present are provided for mounting tools having 7/24ths cones and collars corresponding to the usual standards, with not many machines remaining with collars specific to certain manufacturers.

The known type of fixation described above remains satisfactory for certain applications, but, due to the great increase in power and performance of the machines and machining centers, as ell as very important developments effected in the cutting tools and plates, the fixation of the cones in the spindles is no longer in keeping with the progress realized on the machines and the performance of the tools, and thus constitutes a serious disadvantage, as the power developed by the machines and the resultant forces that can be borne by the tools are not transmissible at the level of the cone.

Specifically, the critical point and the weakness of present fixing means is most frequently situated at the outlet of the spindle, which is a point weakening all the tool holders or tools, these latter having to observe a specific diameter of the tool, which is the large diameter of the end of the cone connected by a cylindrical portion of lesser length to the collar. The same problem also arises, although in a less critical manner, for the fixation of tools to the 7/24ths cone on lathes.

On the other hand, it has been proposed to effect the fixation of tools by means of a cylindrical shank with contact against the forward surface of the spindle. This solution certainly solves the problem of correct contact between the surfaces, but requires a modification of the spindles of the machines. Moreover, the weight of the tool, which is significant in certain applications, risks modifying its alignment with respect to the axis of the spindle and positioning of the tool changer must be effected within extremely narrow tolerances in any direction, so as to permit perfect alignment of the axis of the spindle and of the tool holders.

It has also been proposed, in the case where high performance must be achieved, to obtain simultaneous contact with the cone and with the face of the spindle, to execute, by means of templates specific to each spindle, standard monolithic cones. Such a solution nevertheless results in very high production costs and requires manufacturing tolerances which cannot be maintained for the production of a series of items. Additionally, the tools thus obtained are absolutely specific to a given spindle and in any case cannot be interchanged with tools adapted to other spindles and thus to other machines. This solution is thus of value only for solving specific problems.

The present invention has as an object to overcome these disadvantages.

Specifically, it has as an object a mounting device having a conical shank, especially for the 7/24ths cone, with conical and butt contact for attachments, tool carriers and tools, characterized in that it is especially constituted by a cone for introducing into the spindle, a forward portion centered in the cone and provided with the collar for applying against the face of the spindle, a pull rod for interconnecting the cone and the forward portion, an elastic assembly for pressing the cone into the spindle in locking position, mounted in compression between the cone and the forward portion, and a means for adjusting the said pressing assembly.

The invention will be best understood thanks to the following description, which relates to preferred embodiments, given by way of non-limiting example and explained with reference to the accompanying schematic drawings, in which.

Figure 1:
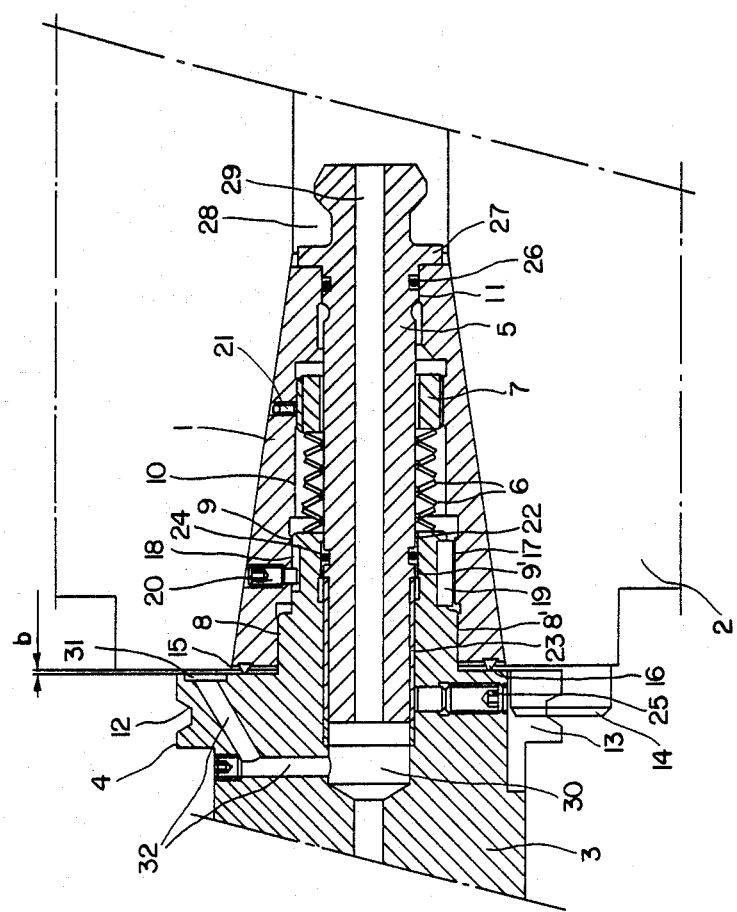
FIG. 1 is a view in side elevation and in section of the device according to the invention.

According to the invention, and as is shown more particularly by way of example in FIG. 1 of the accompanying drawings, the mounting device having a conical shank, especially for the 7/24ths cone, with conical and butt contact, for attachments, tool holders and tools, is essentially constituted by a cone 1 for introduction into the spindle 2, by a forward part 3 centered in the cone 1 and provided with the collar 4 for application against the face of the spindle 2, a pull rod 5 for interconnecting the cone 1 and the forward part 3, a resilient assembly 6 for pressing the cone 1 into the spindle 2 in locking position being mounted in compression between the said cone 1 and the forward part 3, and a means 7 for adjusting the said pressing assembly.

The cone 1 has a length reduced several tenths of a millimeter from the two sides with respect to existing cones and is provided with two concentric bores 8 and 9 for centering the forward part 3, and with a bore 10, having a diameter less than that of the bore 9, intended to receive the resilient assembly 6, which bears at the end opposite bore 9 on the adjusting means 7 housed at the base of the said bore 10, this latter being extended by a bore 11 opening at the opposite end of the cone 1 and serving to guide the pull rod 5, which is provided in this region with a toroidal gasket 26 and which bears on the rear face of the cone 1 by means of a shoulder 27, and the face of the cone 1 turned toward the collar 4 of the forward part 3 is provided with a circular groove 15 for receiving a toroidal gasket 16.

The length of the cone 1 reduced several tenths of a millimeter relative to existing cones means that the cone 1, fixed in spindle 2 of the machine, presents its forward face slightly recessed from the forward face of the spindle 2. Moreover, when cone 1 is in place, its rear face is also slightly nearer to the forward face of the spindle 2 relative to known cones.

The forward part 3, provided with a collar 4, which is wider than existing collars, and which consequently reduces the length of the corresponding cylindrical portion connected to the collar, causes a reduction of the distance separating the rear face of the collar from the forward contact face against the face of the spindle 2, is centered in the cone 1 by means of two concentric cylindrical parts 8' and 9' penetrating respectively into the corresponding bores 8 and 9 of the cone 1 and is locked in the said cone by means of the pull rod 5 against the action of the elastic assembly 6, and the collar 4 is provided in its middle with a peripheral V-shaped groove 12 for receiving the arm of a device for changing tools. Collar 4 is moreover provided with two slots 13 for receiving drive pins 14 of the spindle.

Bores 8 and 9 of cone 1, as well as concentric cylindrical portions 8' and 9' have narrow tolerances permitting, in any case, a slight axial displacement. Collar 4 is intended to permit automatic changing of the device on any type of machine by means of a changer arm or any other device.

It will be understood that the device according to the invention is also usable on machines without a changing capability, that is to say with manual mounting.

The cylindrical portion 9' of the forward part 3 is moreover provided with two slots 17 and 18 for receiving, on the one hand, a cylindrical key or pin 19 fixing for rotation with each other the cone 1 and the portion 3, penetrating into a corresponding slot of the bore 9' of cone 1, and, on the other hand, a screw 20 for retaining the forward part 3.

The elastic assembly 6, received in bore 10, is advantageously formed as a stack of Belleville washers, a helical spring, several springs extending parallelly in the annular chamber delimited by bore 10 and the pull rod 5, or else by a hydraulic or pneumatic means or by any other elastic device, the compressive force of this assembly 6 being adjusted through the intermediary of the means 7 which is advantageously in the form of a threaded sleeve cooperating with a threaded region at the base of the bore 10, this sleeve being locked in service position by means of a set screw 21. These means permit a precise adjustment of the compression of the assembly 6, set screw 21 assuring maintenance of the adjustment.

The screw 20 for retaining the forward part 3, cooperating with the groove 18 of the cylindrical portion 9' of the said portion 3, is intended to prevent accidental disengagement of the part 3 from the cone 1 during a possible changing of the pull rod 5 under the effect of the pressure exerted continuously by the assembly 6.

The forward part 3 is moreover provided with two concentric bores 22 and 23 one of which, 23, is tapped and intended to receive the threaded extremity of the pull rod 5, the other bore 22 being smooth and cooperating with a toroidal gasket 24 received in a corresponding circular groove of the said pull rod, which is locked in service position of the device through the intermediary of a radial screw 25 penetrating into the forward part 3 in the region of one of the grooves 13 for receiving the drive pins 14 of the spindle 2. This screw 25 thus permits effecting a locking of the pull rod 5, both as to its depth of penetration into the portion 3, as well as in rotation.

The forward part 3 may be adapted for mounting various elements such as milling tools, any existing modular systems, male or female, discs, boring bars, drilling heads, special tools, or well as any devices that can be mounted on the front of a milling machine spindle, machining center, unit or general purpose workshop, which can receive a 7/24ths cone or the like.

Figure 2:
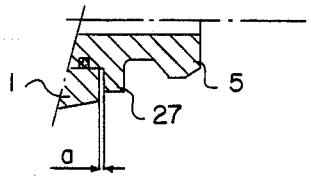
FIG. 2 is a partial section showing the pull rod in its position immobilizing the device.

When mounting the device according to the invention in the spindle 2, prior to locking by the pulling mechanism of the machine, there exists between the forward face of the spindle 2 and the rear face of the collar 4 a space b that is adjustable by locking of the part 3 in the cone 1 by means of the pull rod 5 against the action of the assembly 6 (FIG. 1). This space b is transferred, after fixation by means of the pull rod 5, by locking using the grasping mechanism of the machine, between the shoulder 27 and the corresponding face of the cone 1 to form the space a (FIG. 2). During this fixation, in effect, the pull rod 5, via the action of the grasping mechanism of the machine, pulls the forward part 3, against the action of the assembly 6, into contact, via the rear face of the collar 4, against the spindle 2, the compressive reaction of the assembly 6 resulting in a supplementary application pressure of the cone 1 in its housing in the spindle 2.

According to a variation of the invention not shown in the accompanying drawings, the pull rod 5 may be provided at its rear portion, instead of with the grasping portion 28, with a cylindrical portion provided with a tapping, for fixation for screw threaded pulling.

In a known manner, the device according to the invention may be provided either with existing lubrication devices acting through the exterior of the spindle, requiring a specific lubrication application, or with a lubrication circuit passing through the pull rod 5 in the form of an axial piercing 29 conducting the lubricant into a clearing 30 communicating with channels or holes opening near the cutting tool, or a lubricant inlet via the forward face of the spindle 2 cooperating with the corresponding face of the collar 4, for example by means of two chambers 31 diametrally opposed relative to the said collar 4, these chambers 31 communicating by means of channels 32 with the clearing 30 so as to meet in the manner described above the cutting tool. It will be understood that in this latter case, the pull rod 5 would not be pierced.

The toroidal gaskets 16, 24 and 26 are intended to prevent any penetration of impurities and lubricant oil into the interior of the device.

The mounting of the device according to the invention is effected in the following manner:

Into the bore 10 of cone 1 is inserted, by threading, the means 7 for adjusting the compression of the assembly 6, which is thereafter introduced and the toroidal gasket 16 is inserted in the circular groove 15 of the forward face of the cone 1, then the forward part 3 is introduced into the cone 1 with centering of its cylindrical portions 8' and 9' in the corresponding bores 8 and 9. After positioning toroidal gaskets 24 and 26 in the corresponding recesses on the pull rod 5, this latter is introduced through the rear face of the cone 1 and screwed in the part 3 through the intermediary of the tapping 23 of this latter.

The pull rod 5 is thus locked until obtaining the thickness of the space b, which may be measured using a key, necessary thereafter for the mounting and locking of the device in the spindle 2 of the machine. The screw 20 is then introduced into corresponding groove 18 so as to prevent any accidental disengagement of the assembly formed by the cone 1 and forward part 3 in the case of unscrewing of the pull rod 5. Positioning of the screw 20 is always correctly assured relative to groove 18 thanks to the cooperation the cylindrical key or pin 19 with groove 17.

For mounting according to the invention, it is possible to ensure, in the fixation position of the device, via the grasping mechanism of the machine, a placing of the collar 4 against the spindle 2 and contact under pressure of the cone 1 in the cone of the said spindle 2. Thus, any force developed in the course of machining via the spindle 2 is transmitted thanks to the application of the collar 4 against the spindle 2 and to the contact pressure of the cone 1 in the said spindle 2 due to the traction on the pull rod 5 by the grasping mechanism of the machine, as well as by the driving effected directly by means of pins 14 of the spindle 2 cooperating with grooves 13 of the collar 4.

This direct application of the forward part 3 on the forward face of the spindle 2 permits using all of the power of the machine, as all the weak points, which generally cause vibrations, have been eliminated, cone 1 no longer serving to center the portion 3, this centering being completed by the cooperation between surfaces 8, 9 and 8', 9', through the intermediary of the assembly 6 and the locking force of the grasping system of the machine.

As shown in FIGS. 3 to 7 of the accompanying drawings, the forward portion 3 may have very diverse configurations.

Figure 3:
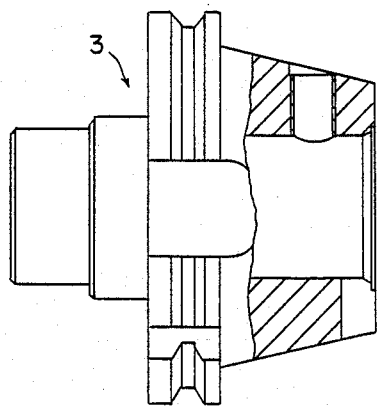
FIGS. 3 to 7 are views in side elevation, partially in section, of possible embodiments of the forward portion centered in the cone.

Thus, FIG. 3 shows a modular mounting for a drill, but any other modular system may be substituted therefor.

Figure 4:
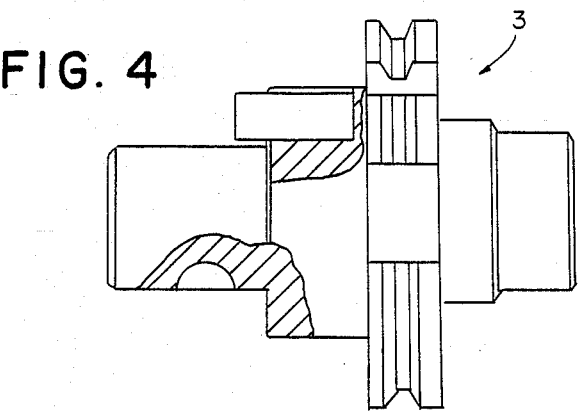

FIG. 4 also shows a modular mounting, but of a male type, also shown simply by way of non-limiting example.

Figure 5:
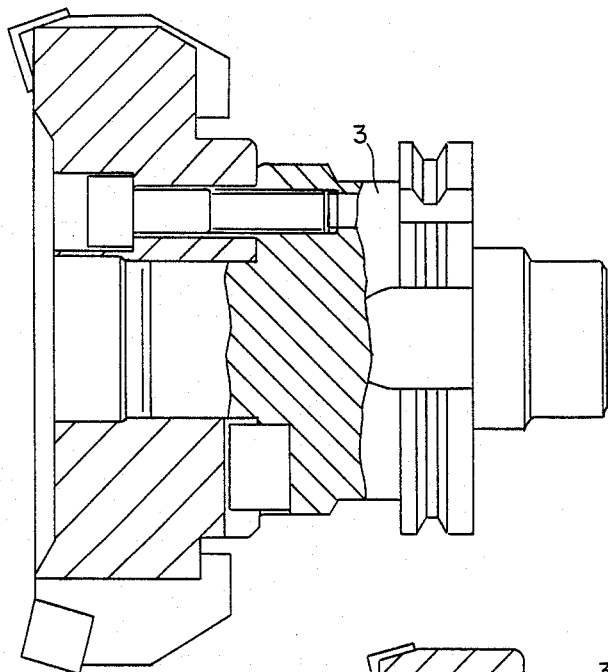
Figure 6:
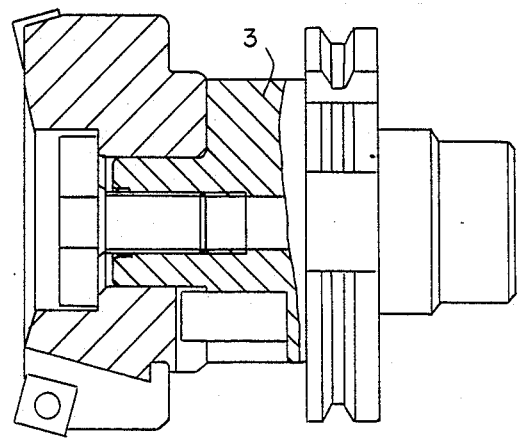

FIG. 5 shows the use of the forward portion 3 as a support for a milling disc with fixation by means of peripheral axial screws. In this case also, another mounting such as for example by central screw with centering in the bore of the milling device, such as shown in FIG. 6, is possible. In such a case, the assembly obtained may have a little less length, especially in the case of using frontally positioned cutting inserts, as shown in FIG. 5.

Figure 7:
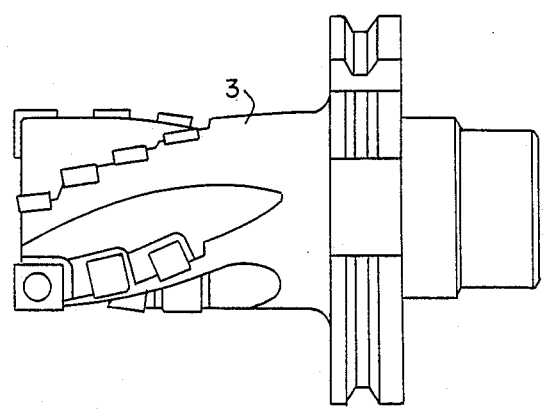

FIG. 7 shows a one piece toothed cylinder milling tool integral with the portion 3. It is also possible to fix such a milling tool by means of a screw and a central centering element.

Figure 8:
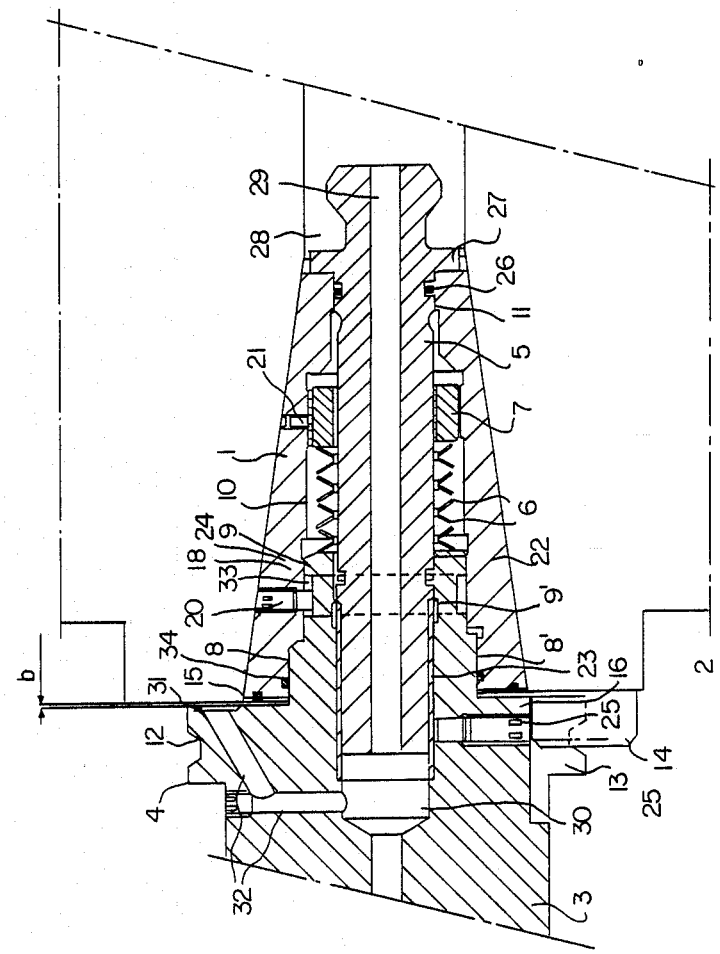
FIG. 8 is a view similar to FIG. 1 of a variation of the invention.

FIG. 8 shows a variation of the invention, in which cylindrical portion 9' of the forward portion 3 is provided with a circular groove 33 cooperating with the screw 20 for retaining the forward part 3 in the cone 1. In this embodiment, the groove 33 is substituted for the slot 17 and 18 and the cylindrical key or pin 19.

Thus, in the case of mounting of the assembly in the spindle of the machine with a locking by pressing of the cone 1 against the walls of the interior cone of the spindle 2, a slight rotation of the element 3 interiorly of cone 1 remains possible and permits a driving of the portion 3 by means of drive pins 14 cooperating with the slots 13, the cone 1 alone assuring centering of the element 3 relative to the spindle 2.

According to another characteristic of the invention, the bore 8 of the cone 1 is moreover provided with a cylindrical groove for receiving a supplementary toroidal gasket 34. This gasket 34 permits ensuring a more secure seal between the portion 3 and the cone 1.

Figure 9:
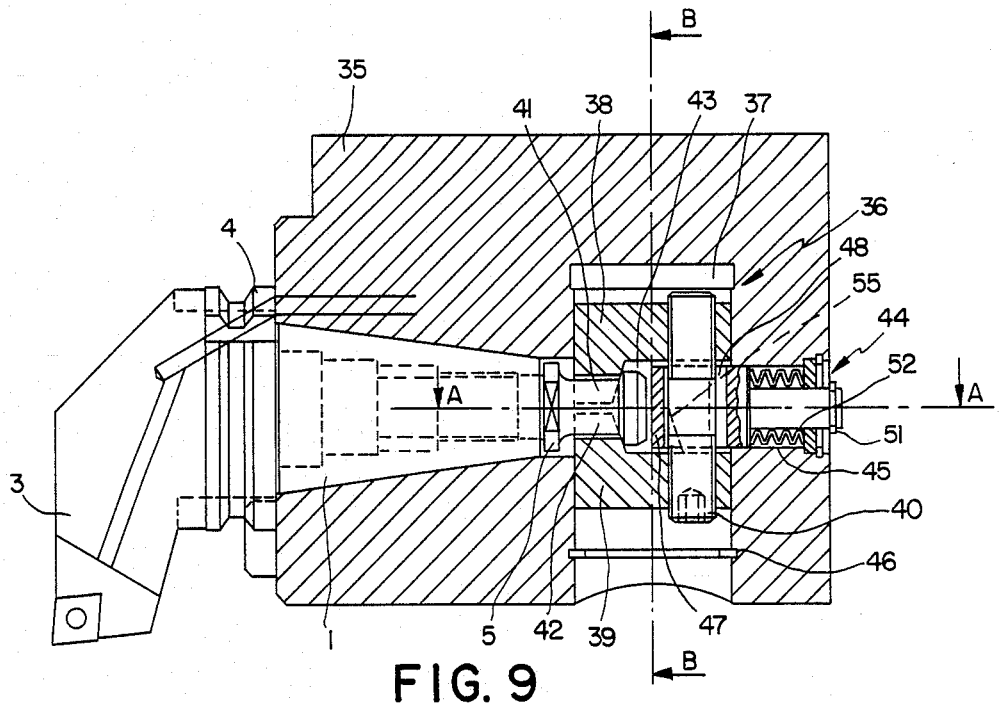
FIG. 9 is a view in side elevation and in section showing the device applied to a tool holder for lathes and turning centers.
Figure 12:
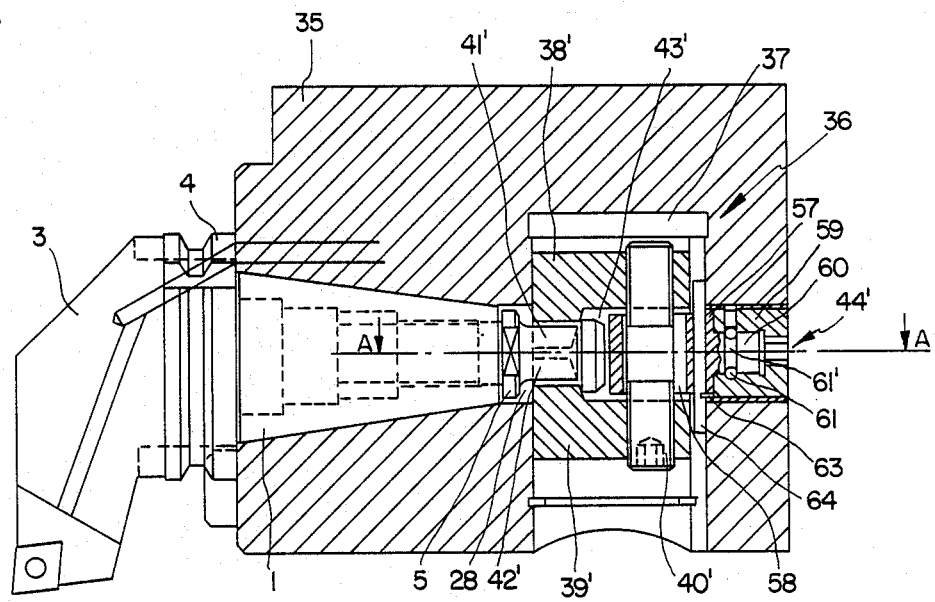
FIG. 12 is a view similar to that of FIG. 9 of a variation of the application of the device to a tool holder for lathes and turning centers.

FIGS. 9 and 12 represent two adaptations of the device according to the invention to tool holders for lathes and turning centers.

To this end, according to a first embodiment of the invention according to FIG. 9, the device is mounted by its cone 1 in a holding cartridge 35 with its collar 4 bearing against the forward face of the said cartridge 35, which is provided in the region of the pull rod 5 with a means 36 for grasping and for locking the end of the said pull rod 5 mounted in a blind housing 37 extending perpendicular or along an acute angle relative to the axis of the portion 3 and of the cone 1 and provided near its open end with a resilient ring 46.

The means 36 for grasping and locking of the end 5 is constituted by two pistons 38 and 39 slidably mounted in the housing 37 and displaceable toward or away from each other by means of an oppositely threaded screw 40, the limitation of the displacement being through the intermediary of the resilient ring 46, the two pistons 38 and 39 having, on the one hand, on their side directed toward the cone 1 each a fork 41, 42 intended to engage in the grasping profile 28 of the rod 5, and, forming, on the other hand, on the side opposite the pull rod 5, between them an opening 43 for receiving a device 44 for ejecting the mounting device having a conical shank, this device 44 extending at one end about the screw 40 and at its other end into a bore 45 opening on the rear face of the cartridge 35, on the axis of the cone 1 and the portion 3.

According to a variation of the invention, not shown in the accompanying drawings, the displacement toward or away from each other of the pistons 38 and 39 in housing 37 may also be effected by means of a simple screw cooperating with a tapping of one of the pistons 38 and bearing via its head in a chamber of the other piston 39, the free end of the head of the screw abutting, at the time of unlocking of this latter, against a resilient ring housed in the above chamber of the head.

The ejection device 44 has at its end surrounding the screw 40 a square section 47 provided with an oblong traverse hole 48 for receiving the screw 40 and connected to a cylindrical portion 49 for guiding in the bore 45 of the cartridge 35, this cylindrical portion 49 being, on the one hand, extended by a rod of cylindrical section 50 extending from the bore 45 and provided in this region with a resilient ring 51, and, on the other hand, loaded by a spring 52 or a series of Belleville washers acting at its other end against a bearing washer 53 maintained on the end of the bore 45 by means of a resilient ring 54.

Figure 10:
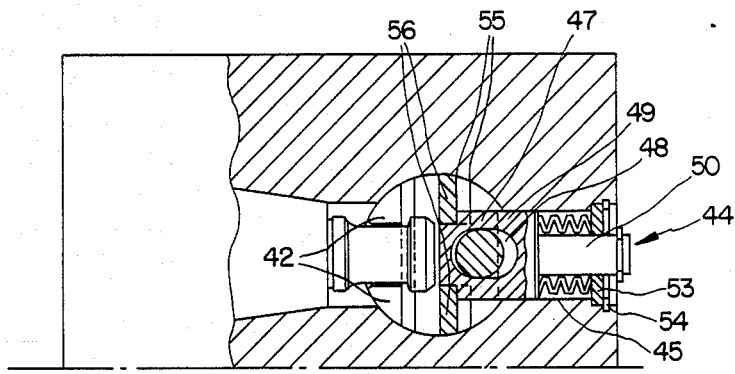
FIG. 10 is a partial section along the line A—A of FIG. 9.

At its free end, the square section 47 of the ejection device 44 has, on two opposite edges, two oblique shoulders 55 bearing on the prongs of a fork 56 inclined in a corresponding manner fixed with one of the pistons 38 or 39 (piston 39 in the embodiment shown in FIGS. 9 and 10).

The assembly formed by pistons 38 and 39 and by the screw 40 is movably mounted in housing 37 and may thus effect an auto-centering with respect to the pull rod 5, the elastic ring 46 preventing their departure from the housing 37. By acting on the screw 40, it is possible to effect a displacement of the pistons 38 and 39 in opposite directions for grasping and locking the end of the pull rod 5 or for unlocking this latter, the resilient ring 46 limiting moreover the opening of the pistons 38 and 39.

Prior to introducing the device through the intermediary of the cone 1 into the cartridge 35, the screw 40 is manipulated by means of a key in the direction causing a maximum spacing apart of the pistons 38 and 39 until they abut, one, 38, against the base of the housing 37, and the other, 39, against the ring 46. In this position, the ejection device 44 is displaced into contact with the elastic ring 51 and its rod 50 against the bearing washer 53. The mounting device according to the invention may thus be introduced into the cartridge 35 until the cone 1 contacts the interior wall of the said cartridge 35, then the screw 40 is acted on in the opposite direction so as to effect a drawing together of the pistons 38 and 39 causing engagement of the forks 41 and 42 of these latter with the grasping profile 28 of the pull rod 5, such that this latter is pulled toward the rear face of the cartridge 35 so as to apply the collar 4 against the forward face of the said cartridge 35. Simultaneously with this movement, the device 44 returns under the action of the inclined prongs of the fork 56 bearing against the oblique shoulders 55 of this latter. Upon completion of locking of the screw 40, an efficient maintenance of the cone 1 in cartridge 35 is obtained.

Unlocking and ejection of the mounting device according to the invention is effected by performing the operation opposite to that described above for locking, actuation of the screw 40 in the opposite direction resulting in disengagement of the pull rod 5 from the forks 41, 42 of the pistons 38 and 39. The return of the piston 39 in the direction of the ring 46 results in permitting a displacement of the device 44 under the action of the spring 52 until the free end of its square section 47 abuts against the pull rod 5, thus unlocking the cone 1. In case the device is not unlocked under the action of spring 52, it always remains possible to effect this unlocking by a hammer blow on the free end of the rod 50.

Figure 11:
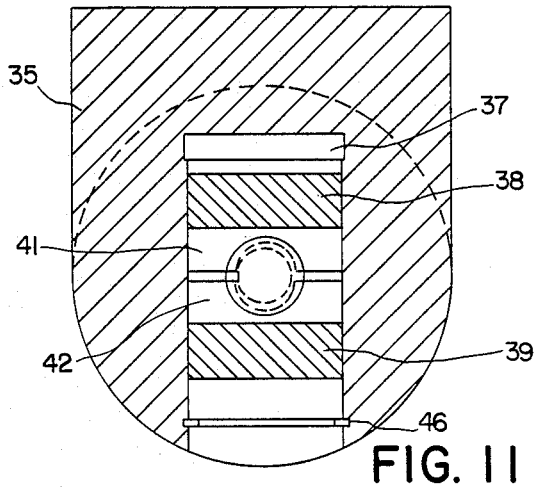
FIG. 11 is a section along the line B—B of FIG. 9.
Figure 13:
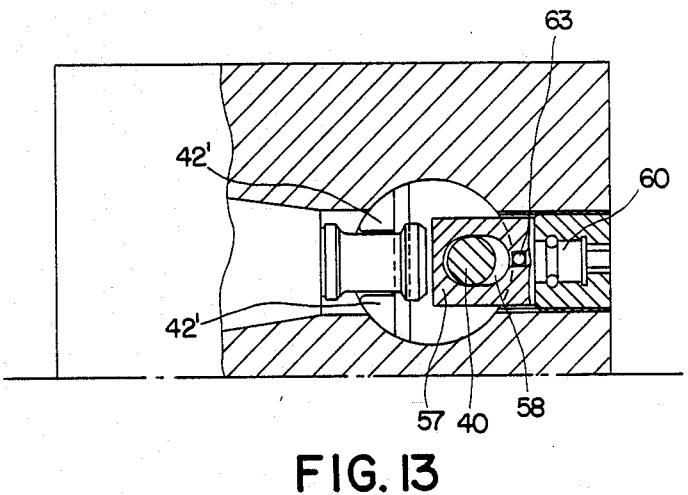
FIG. 13 is a partial section along the line A—A of FIG. 12.

FIGS. 12 and 13 show a variation of the application of the device to a tool holder for lathes or turning centers according to FIGS. 9 to 11. In this embodiment, the piston 39' of the grasping means 36 is devoid of an inclined fork and the ejection device 44' is constituted by a piston 57 penetrating into the opening 43' defined between the pistons 38' and 39' and provided with an oblong notch 58 for passage of the screw 40' for manipulating the pistons 38' and 39', and by a screw 59 for manipulating the piston 57 cooperating with a tapping in the cartridge 35 aligned on the axis of the cone 1 and connected in translation to a portion 60 of reduced diameter of the piston 57 through the intermediary of a ball bearing 61 housed in a circular groove 61', the said screw 59 being provided with a polygonal manipulating opening and the piston 57 being provided, near its end in connection with the screw 59, with a transverse pin 63 extending parallel to the axis of the screw 40' and the ends of which penetrate into a longitudinal groove 64 of the housing 3 of the cartridge 35.

The introduction of the mounting device into the cartridge 35 is effected, the piston 57 being in withdrawn position in the direction of the rear face of the said cartridge 35, and the screw 40' being manipulated in the direction causing maximum spreading apart of the pistons 38' and 39'. After application of the cone 1 against the interior wall of the cartridge 35, the screw 40' is manipulated in the reverse direction so as to spread apart the pistons 38' and 39' to pull the pull rod so as to apply the collar 4 against the forward face of the cartridge 35, as described previously in connection with FIGS. 9 to 11; this is also true as concerns auto-centering of the pistons 38' and 39'.

To effect unlocking of the device, it suffices to manipulate the screw 40' in a manner to spread apart the pistons 38' and 39', then to screw, by means of a key penetrating into the polygonal opening in screw 59, the screw 59 for manipulating the piston 57 so as to lead the end of this latter into contact with a pull rod 5 and to push on this latter so as to expel the cone 1 from the cartridge 4. After this operation, the screw 59 should be restored to its initial position.

In case one forgets to manipulate the screw 59 in the opposite direction, a safeguard is provided constituted by the transverse pin 63 which is displaced from its groove 64 of the housing 39, at the time of displacement of the piston 57, and which is disposed between pistons 38' and 39', such that during manipulation of these latter by means of the screw 40', they abut automatically against the pin 63.

Thanks to the embodiment according to FIGS. 9 to 13, the device according to the invention may be used as well for turning operations as for milling by manually or automatically changing the tool holders.

The cartridges 35 shown in FIGS. 9 to 13 are provided for manual securement of an assembly of tool holders, however other systems for locking may be used. Thus, in the case of using a system with automatic changing, the mounting arrangement for the cone and pull rod remain the same, only the manual locking and ejection mechanism being replaced by a corresponding hydraulic system, such that all the tool holders of a turning center may be changed automatically in the same manner as those for a milling or machining center. Likewise, it is also possible to provide on a turret post an automatic actuating mechanism for the manual unlocking and locking system.

Finally, it is possible, after modification of the turrets, by manufacturers of machine tools, of lathes or of turning centers, to provide in the tool holder turret, for the replacement of present tool holders having cylindrical bores, conical bores with 7/24ths cone for the reception of the device according to the invention, the user being then able to use the same tool holders for turning centers and for milling.

Thanks to the invention, it is possible to provide a mounting device with a conical shank, particularly a 74ths cone, permitting a cone and butt contact for attachments and tool holders and tools, without requiring modification of the spindles of existing machines, and hence utilizable without the cost of supplemental modifications, the application of the collar against the face of the machine spindle taking place without the need for lengthwise clamped tolerances.

Moreover, the device according to the invention may be used interchangeably on all machines and may be provided for the magazine of a machine having the standard variety of tool holders. Likewise, the use of existing tool changers is possible as well as that of the system of the locking mechanism involving a pull rod and pulling on the machine spindle.

Of course, the invention is not limited to the embodiments described and shown in the accompanying drawings. Modifications remain possible, particularly as to the constitution of the various elements whereby substitution of equivalent means, without thus departing from the scope of protection of the invention.

What is claimed is:

1. Mounting device having a conical shank, with conical and butt contact for attachments, tool holders and tools, comprising a cone (1) for introduction into a spindle (2), a forward part (3) separate from and centered in a bore in the cone (1) and provided with a collar (4) for application against the face of the spindle (2), a pull rod (5) for interconnecting the cone (1) and the forward part (3), a resilient assembly (6) for pressing the cone (1) into the spindle (2) in locking position, mounted in compression between the cone (1) and the forward part (3), and means (7) for adjusting said pressing assembly (6).

2. Device, according to claim 1, characterized in that the cone (1) has two concentric bores (8 and 9) for centering the forward part (3), with a bore (10) of a diameter less than that of the bore (9), for the reception of the resilient assembly (6), which bears at the end opposite to the bore (9) on the assembly means (7) disposed at the rear of said bore (10), this latter being prolonged by a bore (11) opening at the end opposite the cone (1) and serving to guide the pull rod (5), which is provided at this level with a toroidal gasket (26) and which bears on the rear face of the cone (1) by means of shoulder (27), and the surface of the cone (1) turned toward the collar (4) of the forward part (3) is provided with a circular groove (15) for the reception of a toroidal gasket (16).

3. Device, according to claim 1, characterized in that the forward part (3), provided with the collar (4) for application against the face of the spindle (2), is centered in the cone (1) by means of two concentric cylindrical parts (8' and 9') extending respectively into the corresponding bores (8 and 9) of the cone (1) and is locked in said cone (1) by means of the pull rod (5) against the action of the resilient assembly (6), and the collar (4) is provided at its middle with a peripheral V-shaped groove (12) for reception of the arm of a tool changing device.

4. Device according to claim 1, characterized in that the cylindrical part (9') of the forward part (3) is also provided with two grooves (17 and 18) for reception, on the one hand, of a cylindrical pin or key (19) for securement in rotation between the cone (1) and the part (3), extending into a corresponding groove in bore (9') of cone (1), and, on the other hand, with a screw (20) for retaining the forward part (3).

5. Device, according to claim 1, characterized in that the resilient assembly (6), disposed in the bore (10) is comprised by a stack of Belleville washers, the force of compression of this assembly (6) being adjusted by means (7) which is preferably in the form of a screw threaded sleeve cooperating with a tapping at the rear of the bore (10), this sleeve being set in operative position by means of a set screw (21).

6. Device, according to claim 1, characterized in that the forward part (3) is provided moreover with two concentric bores (22 and 23) of which one (23) is tapped and is adapted for the reception of the screw-threaded end of the pull rod (5), the other bore (22) being smooth and coacting with a toroidal gasket (24) disposed in a corresponding circular groove in said pull rod (5), which is secured in the operative position of the device by means of a radial screw (25) entering into the forward part (3) at the level of one of the grooves (13) for reception of the drive pins (14) of the spindle (2).

7. Device, according to claim 1, characterized in that a cylindrical part (9') of the forward part (3) is provided with a circular groove (33) coacting with a screw (20) for retaining the forward part (3) in the cone (1).

8. Device, according to claim 2, characterized in that one said bore (8) of the cone (1) is provided moreover with a cylindrical groove for the reception of a supplemental toroidal gasket (34).

9. Device, according to claim 1, characterized in that it is mounted by its cone (1) in a securement cartridge (35) with the collar (4) bearing against the forward face of said cartridge (35) which is provided at the level of the pull rod (3) with means (36) for grasping and locking the end of said pull rod (5) mounted in a blind recess (37) extending at an angle to the axis of the part (3) and of the cone (1) and provided near its open end with a resilient ring (46).

10. Device, according to claim 9, characterized in that the means (36) for gripping and locking the end (5) is constituted by two pistons (38 and 39) mounted slidably in the recess (37) and movable together or apart by means of a screw (40) with reversed threads, whose displacement is limited by means f the resilient ring (46), the two pistons (38 and 39) having, on the one hand, on their side facing toward the cone (1) each a fork (41, 42) adapted to engage in the gripping profile (28) of the pull rod (5) and forming on the other hand on the side opposite the pull rod (5), between themselves a recess (43) for reception of a device (44) for ejection of the mounting device with a conical shank, this device (44) extending, at one end, about the screw (40) and, at its other end, into a bore (45) opening on the rear face of the cartridge (35), on the axis of the cone (1) and of the part (3).

11. Device, according to claim 10, characterized in that the together or apart movement of the pistons (38 and 39) in the recess (37) is effected by means of a simple screw coacting with a tapping on one of the pistons (38) and bearing by its head in a recess in the other piston (39), a resilient ring forming an abutment for the free end of said head in the recess.

12. Device, according to claim 10, characterized in that the ejection device (44) has at its end about the screw (40) a square section (47) provided with an oblong through hole (48) for the reception of the screw (40) and connected to a cylindrical part (49) for guidance in the bore (45) of the cartridge (35), this cylindrical part (49) being, on the one hand, prolonged by a rod of cylindrical section (50) emerging from the bore (45) and provided at this level with a resilient ring (51), and, on the other hand, urged by the spring (52) or a series of Belleville washers acting at its other end against a thrust washer (53) maintained at the end of the bore (45) by means of a resilient ring (54).

13. Device, according to claim 12, characterized in that the square section (47) of the ejection device (45) has, on two opposite edges, two oblique shoulders (55) bearing on the legs of an inclined fork (56) so as to be secured to one of the pistons (38 or 39).

14. Device, according to claim 9, characterized in that the piston (39') of the grasping means (36) is provided with an inclined fork and the ejection device (44′) is constituted by a piston (57) entering the recess (43′) defined between the pistons (38′ and 39′) and provided with an oblong hole (58) for passage of the screw (40′) for moving the pistons (38′ and 39′), and by a screw (59) for moving the piston (57) coacting with a tapping in the cartridge (35) aligned on the axis of the cone (1) and connected for translation to a portion (60) of reduced diameter of the piston (57) by means of a series of balls (61) disposed in a circular groove (61′), said screw (59) being provided with a polygonal manipulation recess (62) and the piston (57) being provided, near its end connected to the screw (59), with a transverse pin (63) extending parallel to the axis of the screw (40′) and whose end enters into a longitudinal groove (64) of the recess (37) of the cartridge (35).

* * * * *